(12) United States Patent
Wagner et al.

(10) Patent No.: US 8,835,070 B2
(45) Date of Patent: Sep. 16, 2014

(54) FUEL CELL HEADER WEDGE

(75) Inventors: Thomas Alan Wagner, Ann Arbor, MI (US); Ronald David Brost, Dearborn, MI (US); Shinichi Hirano, West Bloomfield, MI (US)

(73) Assignee: Ford Motor Company, Dearborn, MI (US)

( * ) Notice: Subject to any disclaimer, the term of this patent is extended or adjusted under 35 U.S.C. 154(b) by 829 days.

(21) Appl. No.: 12/777,797

(22) Filed: May 11, 2010

(65) Prior Publication Data

US 2011/0165492 A1 Jul. 7, 2011

(51) Int. Cl.
*H01M 8/04* (2006.01)
*H01M 8/24* (2006.01)
*H01M 8/10* (2006.01)

(52) U.S. Cl.
CPC .............. *H01M 8/2465* (2013.01); *Y02E 60/50* (2013.01); *H01M 2008/1095* (2013.01); *H01M 8/04089* (2013.01)
USPC .......................................... 429/457; 429/514

(58) Field of Classification Search
USPC ................................. 429/457, 514
See application file for complete search history.

(56) References Cited

U.S. PATENT DOCUMENTS

| 6,670,069 | B2 | 12/2003 | Allen | |
|---|---|---|---|---|
| 6,756,149 | B2 | 6/2004 | Knights et al. | |
| 2004/0046526 | A1 | 3/2004 | Richards | |
| 2005/0129999 | A1 | 6/2005 | Geschwindt et al. | |
| 2008/0107944 | A1 | 5/2008 | Goebel | |
| 2009/0142632 | A1* | 6/2009 | Owejan et al. | 429/22 |
| 2012/0070761 | A1* | 3/2012 | Goebel | 429/459 |

FOREIGN PATENT DOCUMENTS

| DE | 10054444 A1 | 5/2001 |
|---|---|---|
| JP | 57130380 A | 8/1982 |
| JP | 6267564 A | 9/1994 |

OTHER PUBLICATIONS

Liu, et al., Reactant Gas Transport and Cell Performance of Proton Exchange Membrane Fuel Cells With Tapered Flow Field Design, Journal of Power Sources, vol. 158, Issue 1, Jul. 14, 2006, pp. 78-87.

* cited by examiner

*Primary Examiner* — Mark F Huff
*Assistant Examiner* — Monique Wills
(74) *Attorney, Agent, or Firm* — Damian Porcari; Brooks Kushman P.C.

(57) ABSTRACT

A fuel cell system may include a fuel cell stack having a header and active area in fluid communication with the header. The fuel cell system may also include a wedge disposed within the header and configured to alter the cross-sectional area of the header along the length of the stack such that, during operation of the stack, a flow velocity of gas through the active area is generally constant.

5 Claims, 6 Drawing Sheets

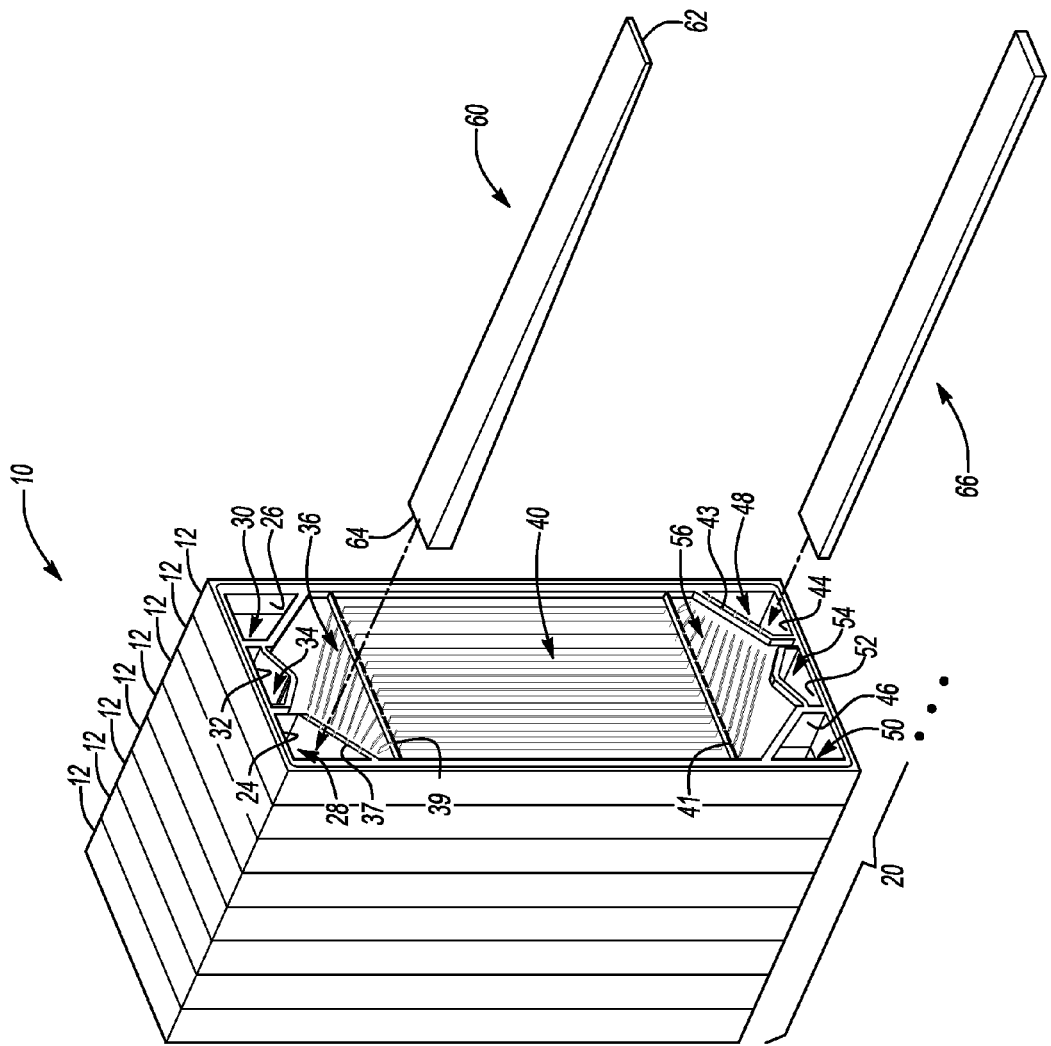
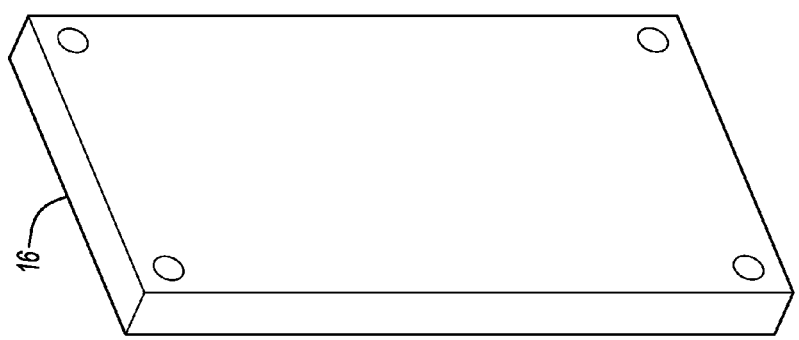

FUEL CELL HEADER WEDGE

BACKGROUND

Uniform gas and coolant distribution may improve the performance of Proton Exchange Membrane (PEM) fuel cell systems while reducing balance of plant requirements. As the number of cells in a stack increases, however, creating uniform gas flow conditions throughout the stack may become difficult. Gas flow variation in a 400 cell fuel cell stack, for example, may cause lower gas velocities in some cells and higher gas velocities in other cells. The reduced flow in some cells may result in lower current densities or cell flooding. Similarly, excessive flow can also lead to durability concerns within the fuel cell stack.

SUMMARY

A power generating system may include a plurality of bipolar plates stacked to form a fuel cell assembly having an inlet header and a wedge disposed within the inlet header. The wedge may be configured to alter the cross-sectional area of the inlet header along the length of the fuel cell assembly and/or engage the plates to align the plates.

BRIEF DESCRIPTION OF THE DRAWINGS

FIG. 6 is an exploded assembly view of a portion of the fuel cell assembly of FIG. 1.

DETAILED DESCRIPTION

Figure 1:
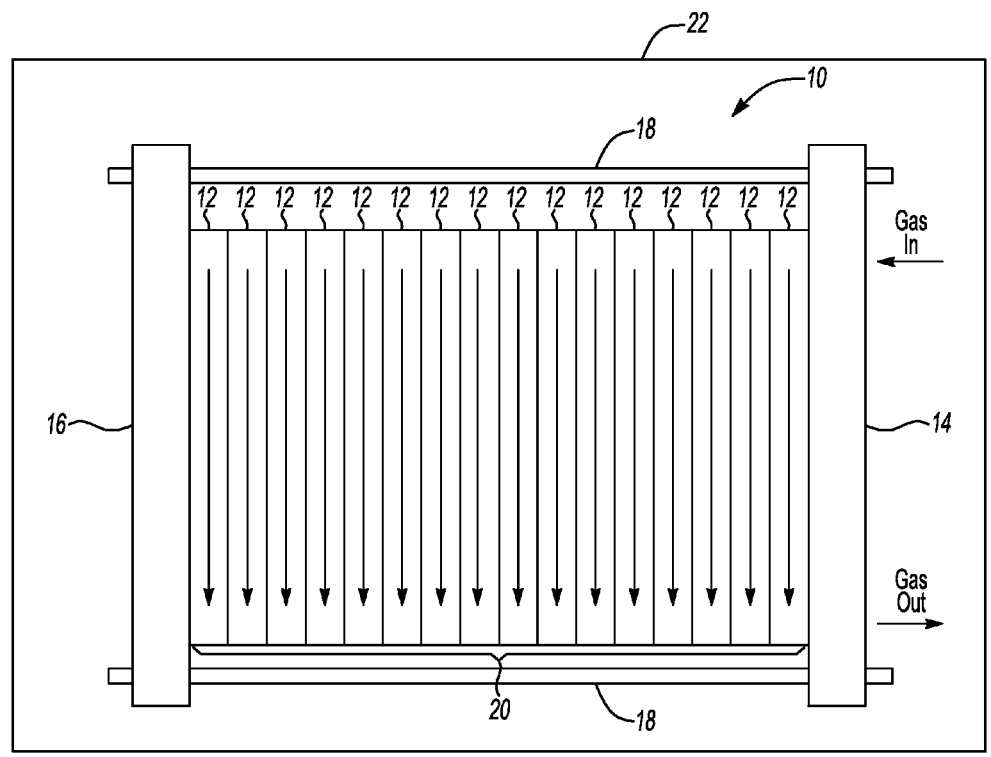
FIG. 1 is a side view of an embodiment of a fuel cell assembly.

Referring to FIG. 1, an embodiment of a fuel cell assembly 10 includes a plurality of stacked bipolar fuel cell plates 12, end plates 14, 16, and clamps 18. The stacked fuel cell plates 12 form a fuel cell stack 20. The end plate 14 includes inlet and outlet ports (not shown).

Gases, such as hydrogen and air, enter the fuel cell stack 20 via the inlet ports and exit the fuel cell stack 20 via the outlet ports (as indicated by arrow). Coolant also enters the fuel cell stack 20 via one of the inlet ports and exits the fuel cell stack 20 via one of the outlet ports.

As known in the art, electrical energy may be generated by the fuel cell stack 20 as the hydrogen and oxygen react. This electrical energy may be used to power various electrical devices and/or stored within an energy storage unit.

The fuel cell stack 20 of FIG. 1, for example, is configured to provide motive power for a vehicle 22. That is, the fuel cell stack 20 is electrically connected in a known fashion with an electric machine (not shown) that converts electrical energy generated by the fuel cell stack 20 to mechanical energy used to move the vehicle 22. Alternatively, the fuel cell stack 20 may be electrically connected with a battery (not shown) as mentioned above to store electrical energy generated by the fuel cell stack 20. An electric machine may be configured in a known fashion to draw electrical energy from the battery to produce mechanical energy used to move the vehicle 22. Other arrangements are, of course, also possible.

Figure 2:
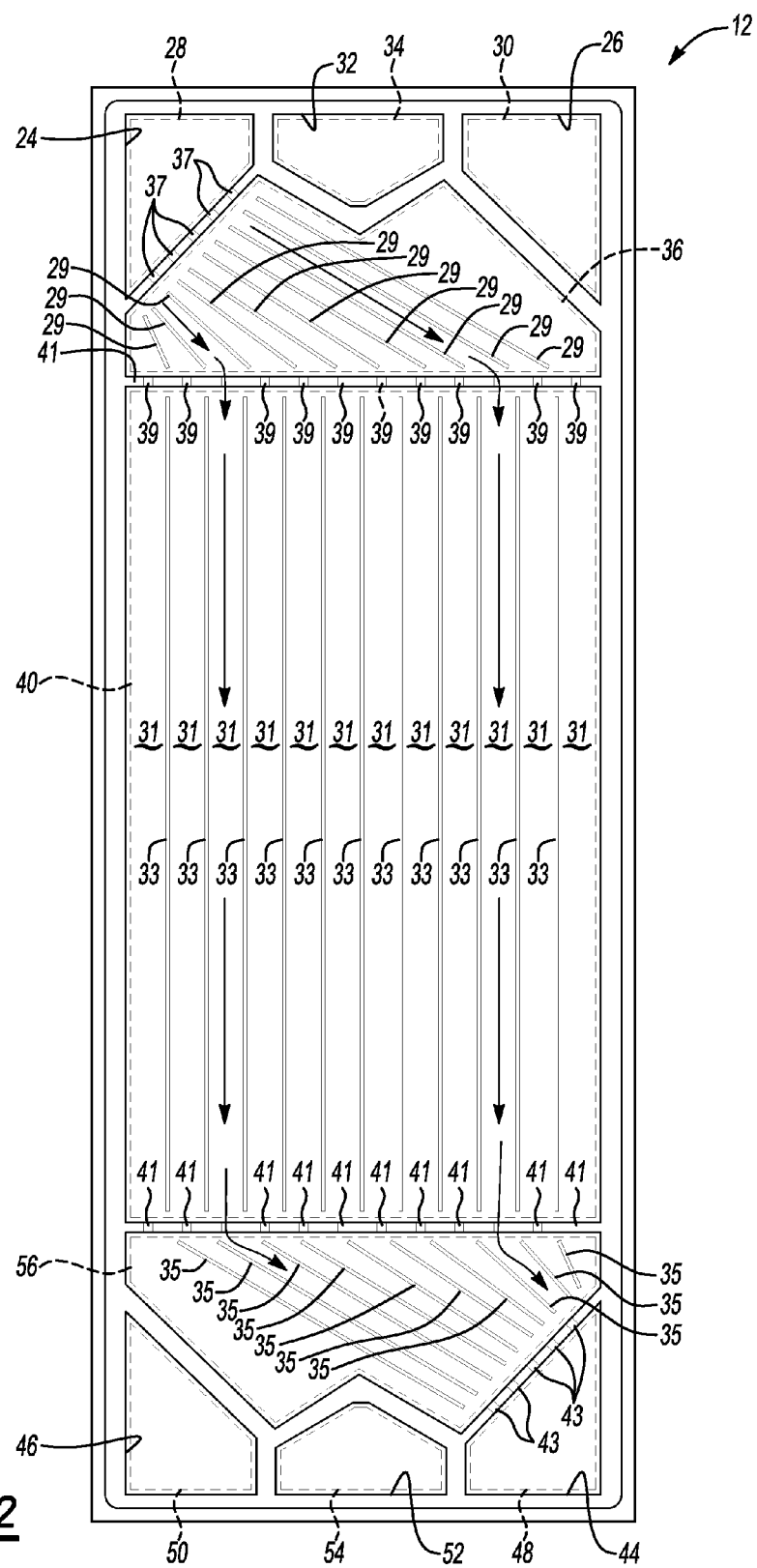
FIG. 2 is a front view of a bipolar fuel cell plate.
Figure 3:
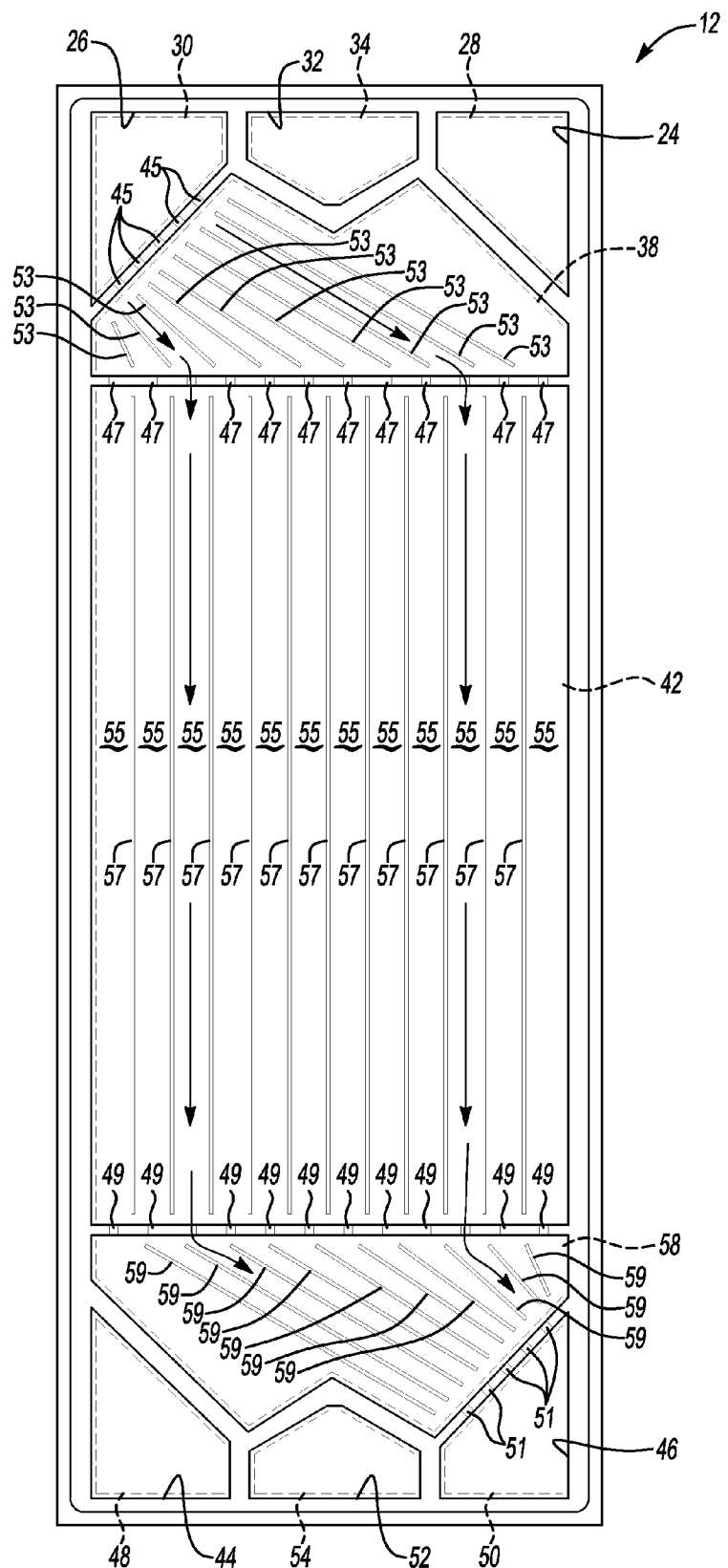
FIG. 3 is a rear view of the bipolar fuel cell plate of FIG. 2.

Referring to FIGS. 2 and 3, a bipolar fuel cell plate 12 may include inlet header surfaces 24, 26 defining, respectively, fluid passageways 28, 30, inlet coolant surface 32 defining coolant passageway 34, inlet transition areas 36, 38, and active areas 40, 42. The bipolar fuel cell plate 12 may also include outlet header surfaces 44, 46 defining, respectively, passageways 48, 50, outlet coolant surface 52 defining coolant passageway 54, and outlet transition areas 56, 58. Any suitable/known plate arrangement, however, may be used.

A gas, such as hydrogen, may flow through the fluid passageway 28 (which is in fluid communication with an inlet port of the end plate 14 of FIG. 1) and enter the inlet transition area 36 via feed passageways 37 that fluidly connect the fluid passageway 28 and the inlet transition area 36. The inlet transition area 36, as known in the art, distributes the hydrogen across the plate 12 via walls 29 prior to entering the active area 40 by way of openings 39 that fluidly connect the inlet transition area 36 and active area 40. (Hydrogen within the active area 40 may then travel along channels 31 defined by walls 33.)

Hydrogen may exit the active area 40 by way of openings 41 that fluidly connect the active area 40 and the outlet transition area 56. The outlet transition area 56, as known in the art, directs the hydrogen via walls 35 toward return passageways 43 that fluidly connect the outlet transition area 56 and fluid passageway 48 (which is in fluid communication with an outlet port of the end plate 14 of FIG. 1).

Air may flow through the fluid passageway 30 (which is in fluid communication with an inlet port of the end plate 14 of FIG. 1) and enter the inlet transition area 38 via feed passageways 45 that fluidly connect the fluid passageway 30 and the inlet transition area 38. The inlet transition area 38 distributes the air across the plate 12 via walls 53 prior to entering the active area 42 by way of openings 47 that fluidly connect the inlet transition area 38 and active area 42. (Air within the active area 42 may then travel along channels 55 defined by walls 57.)

Air may exit the active area 42 by way of openings 49 that fluidly connect the active area 42 and the outlet transition area 58. The outlet transition area 58 directs the air via walls 59 toward return passageways 51 that fluidly connect the outlet transition area 58 and fluid passageway 50 (which is in fluid communication with an outlet port of the end plate 14 of FIG. 1).

A coolant, such as water, may flow through the fluid passageway 34 (which is in fluid communication with an inlet port of the end plate 14 of FIG. 1) and enter a gap (not shown) within the bipolar fuel cell plate 12. This gap separates the transition areas 36, 56 and active area 40 from the transition areas 38, 58 and active area 42 by way of openings (not shown) that fluidly connect the fluid passageway 34 and this gap. Water may exit the gap by way of openings (not shown) that fluidly connect the gap and the fluid passageway 54 (which is in fluid communication with an outlet port of the end plate 14 of FIG. 1).

As mentioned above, the pressure within, for example, the fluid passageway 28 may be higher the closer the bipolar fuel cell plate 12 is positioned relative to the hydrogen inlet port of the end plate 14 (FIG. 1). The pressure within the fluid passageway 28 may be lower the further away the bipolar fuel cell plate 12 is positioned relative to the hydrogen inlet port of the end plate 14. The same may be true for pressures within the fluid passageways 30.

This plate to plate difference in pressure gradients within the inlet headers that may depend on where the plate 12 is located relative to the inlet ports of the end plate 14 (FIG. 1) may result in non-uniform gas flow through the active areas 40, 42 along the length of the fuel cell stack 20 (FIG. 1). That is, the active areas 40, 42 of the plates 12 located proximate to the end plate 14 may have gas flow velocities that are greater than those of the active areas 40, 42 of the plates 12 located proximate to the end plate 16.

Figure 4:
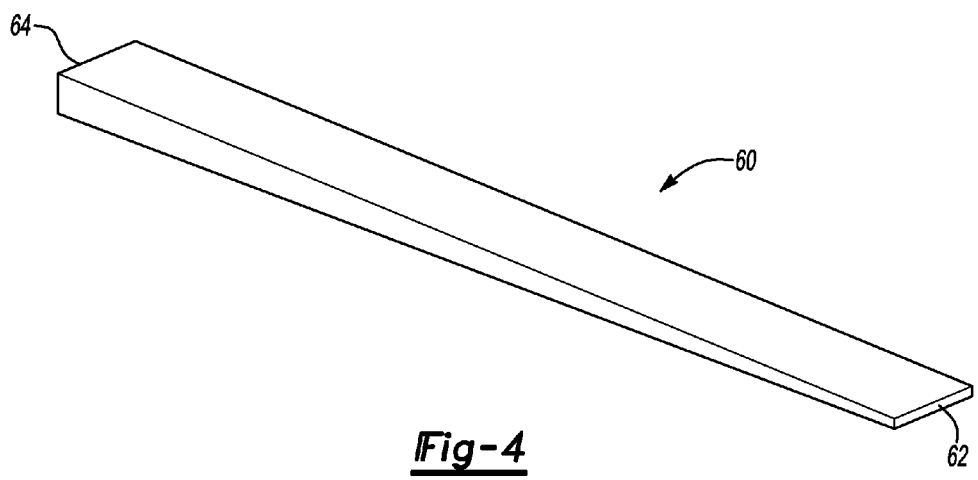
FIG. 4 is a perspective view of an embodiment of a fuel cell header wedge.

Referring to FIG. 4, an embodiment of a fuel cell header wedge 60 may include a thin end 62 and a thick end 64 opposite the thin end 62. In the embodiment of FIG. 4, the wedge 60 has a generally rectangular shape (designed to mate with, for example, portions of the inlet header surfaces 24, 26 of FIGS. 2 and 3) and tapers from the thick end 64 to the thin end 62. The wedge 60, in other embodiments however, may take on any suitable shape and/or size depending on, for example, flow characteristics associated with the fuel cell stack 20 (FIG. 1), design considerations, etc. As discussed in further detail below, the wedge 60 may be positioned within the fuel cell stack 20 to alter the cross-sectional areas of (and thus the pressure gradients within) either of the fluid passageways 28, 30 and/or align the plates 12 (FIG. 1) of the fuel cell stack 20.

Figure 5:
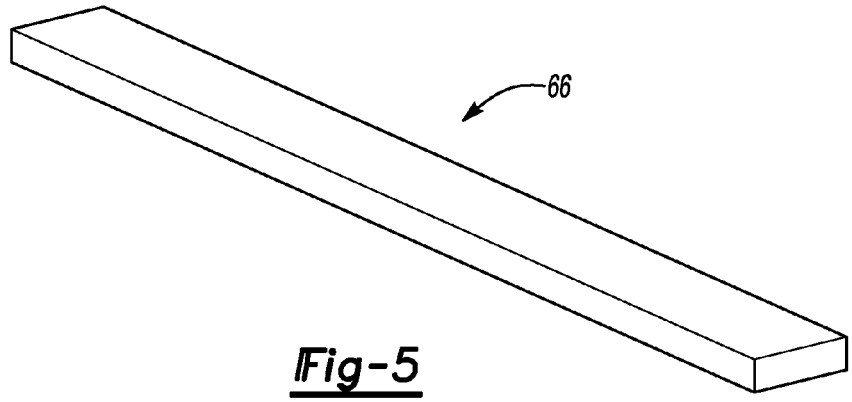
FIG. 5 is a perspective view of another embodiment of a fuel cell header wedge.

Referring to FIG. 5, another embodiment of a fuel cell header wedge 66 has a generally rectangular shape (designed to mate with, for example, portions of the outlet header surfaces 44, 46 of FIGS. 2 and 3) and a generally uniform thickness. As discussed in further detail below, the wedge 66 may be positioned within the fuel cell stack 20 (FIG. 1) to align the plates 12 (FIG. 1) of the fuel cell stack 20.

Referring to FIG. 6, a portion of the fuel cell assembly 10 is shown exploded. As apparent to those of ordinary skill, the fluid passageways 28, 30 associated with each of the plates 12 collectively form respective inlet headers (defined, respectively, by the inlet header surfaces 24, 26 of each of the plates 12). Likewise, the fluid passageways 48, 50 associated with each of the plates 12 collectively form respective outlet headers (defined, respectively, by the outlet header surfaces 44, 46 of each of the plates 12). Similarly, (i) the inlet transition areas 36 of each of the plates 12 may collectively define an inlet (hydrogen) transition area of the fuel cell stack 20, (ii) the inlet transition areas 38 of each of the plates 12 may collectively define an inlet (air) transition area of the fuel cell stack 20, (iii) the active areas 40 of each of the plates 12 may collectively define an active (hydrogen) area of the fuel cell stack 20, and (iv) the active areas 42 of each of the plates 12 may collectively define an active (air) area of the fuel cell stack 20, etc.

In this example, the wedge 60 resides within the inlet header formed by the fluid passageways 28 of each of the plates 12, with the thick end 64 disposed adjacent to the end plate 16 and the thin end 62 disposed adjacent to the end plate 14 (not shown). The tapered shape of the wedge 60 effectively reduces the cross-sectional area of the inlet header along the fuel cell stack 20 as the wedge 60 becomes thicker so as to compensate for any loss in gas volume associated with being further away from the inlet ports associated with the end plate 14. Additionally, because the wedge 60 is generally shaped to mate with portions of the inlet header surfaces 24 defining the inlet header, the wedge 60 may assist in aligning the plates 12 during assembly and keeping the plates 12 aligned during operation.

The wedge 66 resides within the outlet header formed by the fluid passageways 48. Because the wedge 66 is generally shaped to mate with portions of the outlet header surfaces 46 defining the outlet header, the wedge 66 may likewise assist in aligning the plates 12 during assembly and keeping the plates 12 aligned during operation.

Figure 7:
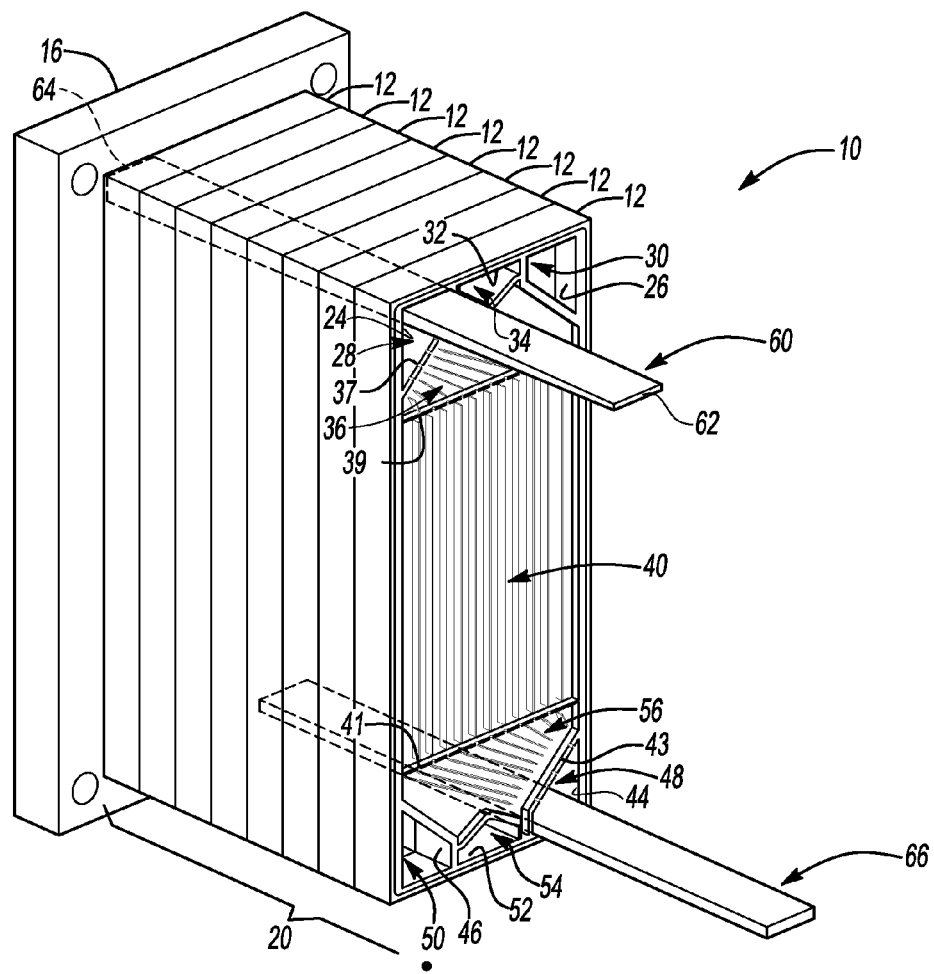
FIG. 7 is an assembly view of the portion of the fuel cell assembly of FIG. 6.

Referring to FIG. 7, the wedges 60, 66 are shown in place. In other examples, the wedge 60 may reside within either (or both) of the inlet headers formed by the fluid passageways 28, 30. Likewise, the wedge 66 may reside within either (or both) of the outlet headers formed by the fluid passageways 48, 50, etc.

The wedges disclosed herein may be formed or manufactured in any suitable fashion. For example, the wedge 60 may be molded in plastic or machined from suitable metal stock. Alternatively, the wedge 60 may be formed in place. Lubricated removable gates may be inserted into the inlet headers along with stops designed into the end plates 14, 16. An epoxy resin, for example, may then be applied. After hardening, the lubricated removable gates may be removed. Other techniques and scenarios are also possible.

The gas velocity versus plate number from inlet was analyzed using computational fluid dynamic techniques for fuel cell assemblies similar to those described herein. In a first simulation, the fuel cell assembly analyzed lacked wedges as described herein. In a second simulation, wedges similar to those described with reference to FIGS. 4 and 5 were included in the fuel cell assembly analyzed.

Figure 8:
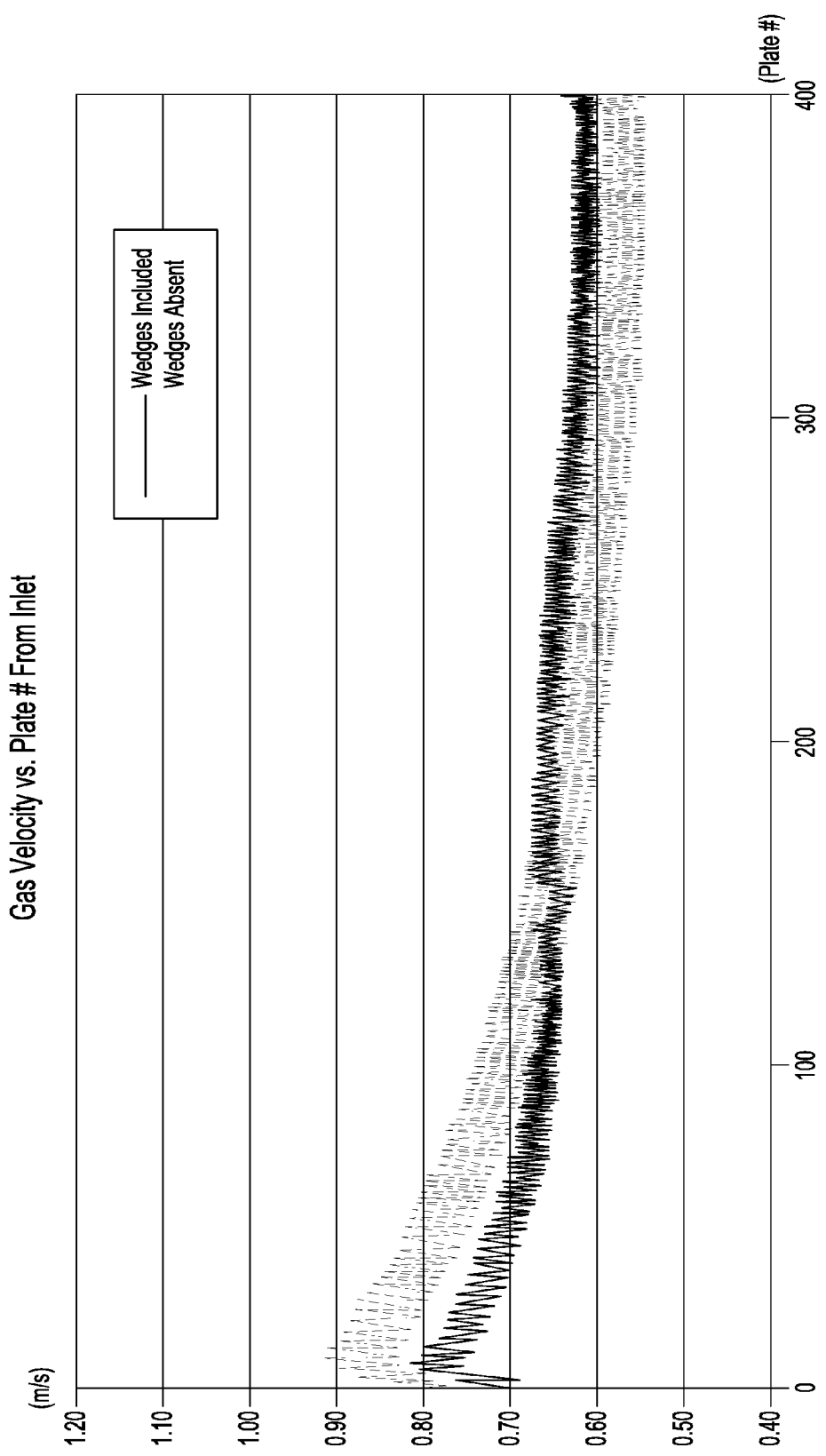
FIG. 8 is an example plot of gas velocity versus plate number from inlet for fuel cell assemblies with and without wedges.

Referring to FIG. 8, a comparison of the gas velocity versus plate number from inlet is depicted for the simulations. The introduction of the wedge appears to reduce the variation in gas velocity through the activate area along the fuel cell assembly relative to circumstances where the wedge is absent. For example, the standard deviation in velocity distribution dropped from 0.087 m/s (without the wedge) to 0.0379 m/s (with the wedge).

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. A vehicle comprising:
a fuel cell system for providing power to move the vehicle and including a fuel cell stack having a header and active area in fluid communication with the header and a wedge inserted within the header parallel to gas flow through the header and configured to alter a cross-sectional area of the header along an entire length of the header such that, gas flow through the active area is generally constant.

2. The vehicle of claim 1 wherein the wedge is tapered.

3. The vehicle of claim 2 wherein the fuel cell stack further has a gas inlet side, wherein the wedge has a thick end and a thin end, and wherein the thin end of the wedge is disposed proximate to the gas inlet side.

4. The vehicle of claim 1, wherein the fuel cell stack further has another header and wherein the fuel cell system further includes another wedge disposed within the another header.

5. The vehicle of claim 4 wherein the another wedge has a generally rectangular shape.

* * * * *